(12) United States Patent
Savariar

(10) Patent No.: US 6,228,970 B1
(45) Date of Patent: May 8, 2001

(54) POLY (BIPHENYL ETHER SULFONE)

(75) Inventor: Selvaraj Savariar, Duluth, GA (US)

(73) Assignee: BP Amoco Corporation, Chicago, IL (US)

( * ) Notice: Subject to any disclaimer, the term of this patent is extended or adjusted under 35 U.S.C. 154(b) by 0 days.

(21) Appl. No.: 09/400,768

(22) Filed: Sep. 22, 1999

Related U.S. Application Data
(60) Provisional application No. 60/101,878, filed on Sep. 25, 1998.

(51) Int. Cl.[7] .................................................. C08G 65/40
(52) U.S. Cl. ........................ 528/125; 528/126; 528/128; 528/174; 528/373; 525/534; 525/535
(58) Field of Search .................................... 528/125, 126, 528/174, 373; 525/534, 535

(56) References Cited

U.S. PATENT DOCUMENTS

| | | | |
|---|---|---|---|
| 3,634,355 | 1/1972 | Barr et al. ............................... | 260/49 |
| 4,108,837 | 8/1978 | Johnson et al. ....................... | 528/126 |
| 4,175,175 | 11/1979 | Johnson et al. ....................... | 528/125 |
| 4,654,410 | 3/1987 | Kashiwame et al. ................. | 528/171 |
| 4,687,833 | 8/1987 | Clendinning et al. ............... | 528/174 |
| 4,785,072 | 11/1988 | Johnson et al. ....................... | 528/125 |
| 4,939,228 | 7/1990 | Robeson et al. ...................... | 528/171 |
| 5,239,044 | 8/1993 | Cooper et al. ........................ | 528/174 |
| 5,326,834 | 7/1994 | Sauers et al. ......................... | 528/174 |

FOREIGN PATENT DOCUMENTS

| | | |
|---|---|---|
| 1431030 | 4/1976 | (GB) . |
| 1492366 | 11/1977 | (GB) . |

OTHER PUBLICATIONS

Russian Article, Study of a Low–Molecular–Weight Cyclic Product in Polysulfone; Vysokomol. Soyedin., Ser. B., vol. 24, No. 1, pp. 66–619, 1982. Plastmassy Pilot Plant, the month in the date of publication is not available.

*Primary Examiner*—P. Hampton-Hightower
(74) *Attorney, Agent, or Firm*—Thomas E. Nemo; Richard J. Schlott

(57) ABSTRACT

A new poly (biphenyl ether sulfone) having improved polydispersity and also having low levels of low molecular weight oligomer.

13 Claims, 1 Drawing Sheet

POLY (BIPHENYL ETHER SULFONE)

This application claims the benefit of U.S. Provisional Application No. 60/101,878, filed Sep. 25, 1998.

This invention relates to new poly (biphenyl ether sulfones). More particularly, this invention relates to a new poly (biphenyl ether sulfone) having improved polydispersity, improved melt flow characteristics for a given number average molecular weight, and lower levels of low molecular weight oligomeric components.

BACKGROUND OF THE INVENTION

A number of poly (aryl ether sulfones) have been known for many years. They are linear polymers possessing a number of desirable features such as excellent high temperature resistance, good electrical properties, and toughness. One commercially important group of poly (aryl ether sulfones) are those containing a biphenyl group or moiety, typically derived from the monomer, 4,4'-biphenol. Poly (aryl ether sulfones) which contain the biphenyl, also called biphenylene group, are available from BP Amoco Polymers, Inc. under the tradename of Radel® Radel R®, one of such Radel® materials, has the structure 1 and has

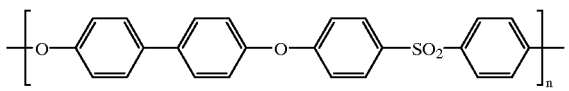

a Tg of about 220° C. and is suitably made by the nucleophilic polycondensation of 4,4' -biphenol with 4,4'-dichlorodiphenyl sulfone as described, for example, in U.S. Pat. Nos. 4,108,837 and 4,175,175. Poly (aryl ether sulfones) which contain at least in part the 4,4'-biphenyl moiety, e.g., derived from 4,4'-biphenol, and also called the 4,4'-biphenylene moiety, are hereinafter referred to as poly (biphenyl ether sulfones). Due to their excellent mechanical and other properties, poly (biphenyl ether sulfones) can be used to manufacture a variety of useful articles such as molded articles, films, sheets and fibers.

It also offers high chemical and solvent resistance. Hence, it is particularly useful for manufacturing articles that are exposed to solvents or chemical agents at elevated temperatures and for extended times. Thus, poly (aryl ether sulfones) find application in articles such as medical trays which are subjected to repeated and rigorous sterilization procedures.

Many of the important articles made from poly (biphenyl ether sulfones) are manufactured by injection or other molding process. Although the currently available poly (biphenyl ether sulfones) have been very successful for the manufacture of molded articles, it would be desirable to have a poly (biphenyl ether sulfone) that has melt flow characteristics so that molding operations can be performed with improved flow and molding performance. This invention provides for such improved poly (biphenyl ether sulfones). The poly (biphenyl ether sulfones) of this invention have improved polydispersity, a lower level of undesirable low molecular weight oligomeric components and have improved melt flow properties compared to existing poly (biphenyl ether sulfones).

Although the improved poly (biphenyl ether sulfones) of this invention are not limited by the manner in which the poly (biphenyl ether sulfones) are prepared, we have determined that poly (biphenyl ether sulfones) having improved polydispersity and reduced amounts of low molecular weight oligomeric materials can be prepared by adjusting the concentration of the monomer reactants in a solution polymerization reaction that can be used to make poly (biphenyl either sulfones). By conducting the solution polymerization reaction at relatively high concentrations, thereby forming a polymerization reaction mixture with high polymer solids content, the improved poly (biphenyl ether sulfones) of this invention can be prepared.

SUMMARY OF THE INVENTION

This invention is a poly (biphenyl ether sulfone) having improved polydispersity. This invention is a poly (biphenyl ether sulfone) having low levels of low molecular weight oligomers, preferably no more than about one weight percent low molecular weight oligomers. This invention is also a process for making such improved poly (biphenyl ether sulfones).

DETAILED DESCRIPTION OF PREFERRED EMBODIMENTS

Figure 1:
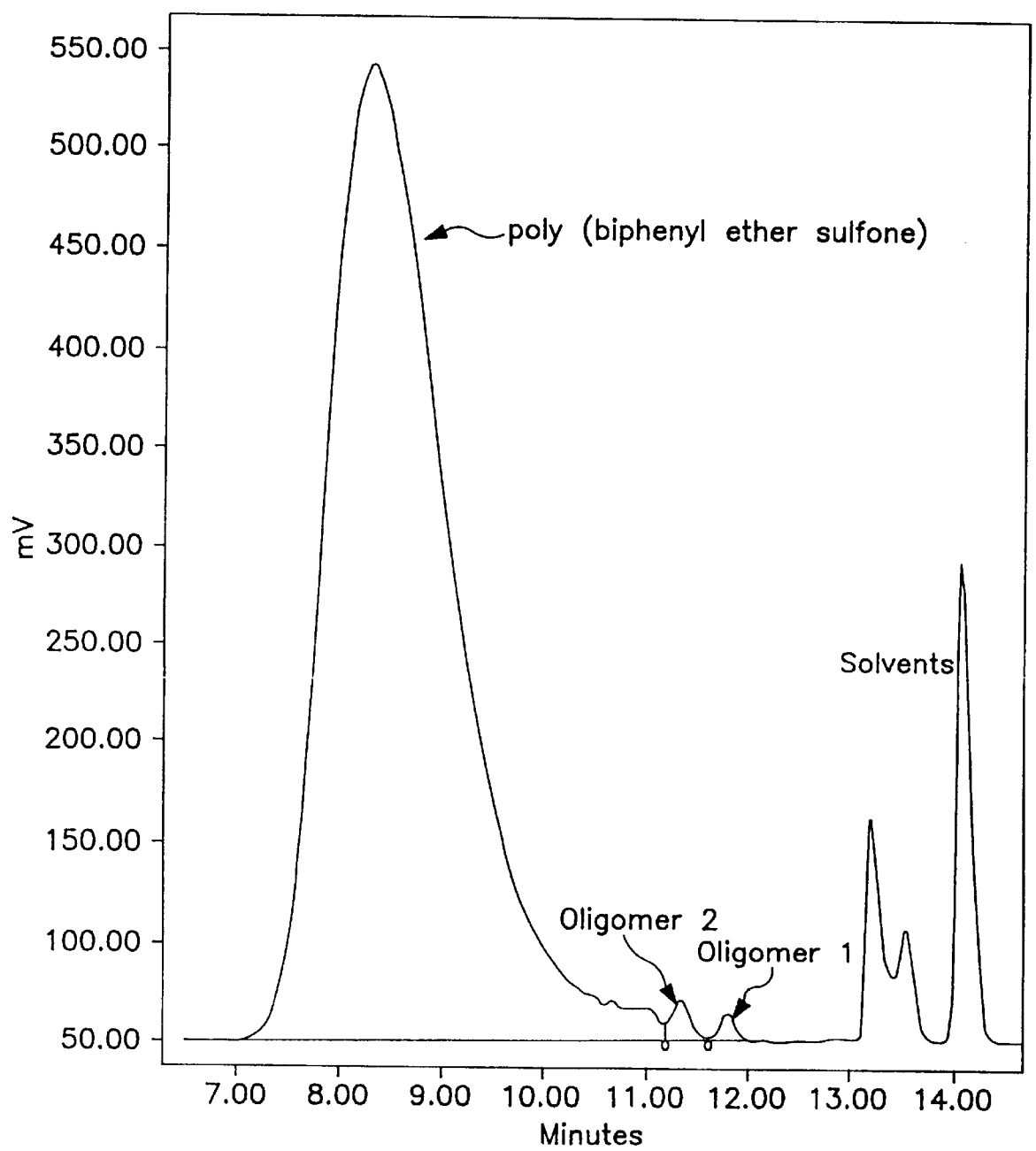
FIG. 1 shows a chromatogram from the analysis of a poly (biphenyl ether sulfone) using size exclusion liquid chromatography.

This invention is a poly (biphenyl ether sulfone) having improved polydispersity, lower amounts of undesirable low-molecular weight oligomeric components and improved melt flow properties. The poly (biphenyl ether sulfones) of this invention have properties which make them superior for manufacturing molded and other articles of manufacture.

The poly (biphenyl ether sulfones) of this invention comprise the repeating unit

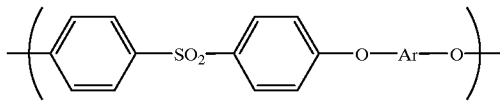

preferably wherein at least about 50 and more preferably at least about 75 mole percent of the divalent Ar groups is p-biphenylene (4,4'-biphenylene) and the remainder, if any, suitably comprises but is not limited to at least one member selected from p-phenylene, 4,4'-diphenyl sulfone and 2,2-diphenyl propane. In general, it is preferable to have the mole amount of biphenyl or biphenylene moieties high, for example, at least about 90 mole percent in the poly (biphenyl ether sulfone) since it results in a polymer with superior properties.

The 4,4'-biphenyl or 4,4'-biphenylene moiety has structure

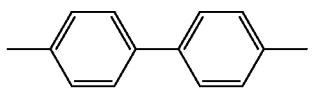

The poly (biphenyl ether sulfones) of this invention have low levels of low molecular weight oligomeric materials. These oligomeric materials can have the general structure

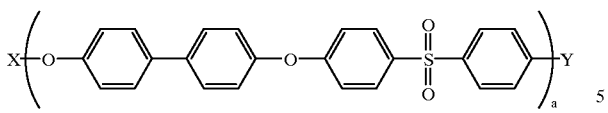

where a is typically an integer from about 1 to about 10, and where x can be methyl or hydrogen and y can be chlorine or hydroxy. The low molecular weight oligomer can also be cyclic. In such cases, a is 2 or greater, generally 2 to about 10, and x and y form a chemical bond. In the low molecular weight oligomer, y can also be another biphenyl moiety which may be substituted with a hydroxy or methoxy group. Similarly, x may be a sulfone moiety and may be substituted with chlorine. Generally, the majority of the low molecular weight oligomers are cyclic. For example, at least about 80% by weight, more preferably at least about 90% by weight and most preferably at least about 95% by weight of the low molecular weight oligomers are cyclic. The preferred poly (biphenyl ether sulfones) of this invention have no more than about 1 weight percent, more preferably no more than about 0.9 weight percent, and most preferably no more than about 0.75 weight percent low molecular weight oligomeric materials. More particularly, the preferred poly (biphenyl ether sulfones) of this invention have no more than about 1 weight percent, more preferably, no more than about 0.9 weight percent, and most preferably, no more than about 0.75 weight percent of the oligomers that elute as the two major resolved components after the elution of the poly (biphenyl ether sulfone) and prior to the elution of polymerization reaction solvent, if any is present, when analyzed by size exclusion liquid chromatography using, preferably, a P1 gel 5 $\mu$m mixed-D, 300×7.5 mm column available from Polymer laboratories using, preferably methylene chloride as the elutant. A typical chromatogram from the analysis of oligomer in a poly (biphenyl ether sulfone) containing all biphenylene moieties as the dihydroxy component of the poly (biphenyl ether sulfone) is shown in FIG. 1. The peaks corresponding to the oligomer are identified in the FIG. 1. Still more particularly, the preferred poly (biphenyl ether sulfones) of this invention have no more than about 1 weight percent, more preferably no more than about 0.9 weight percent, and most preferably no more than about 0.75 weight percent of the cyclic oligomers represented by the structure above (x and y forming a single chemical bond) and where a is 2, 3 or 4 or a combination thereof. The low molecular weight oligomers described herein typically have a molecular weight of about 4000 and lower, more preferably about 2000 and lower.

The poly (biphenyl ether sulfones) of this invention have a higher number average molecular weight (Mn) for a given weight average molecular weight (Mw) compared to prior poly (biphenyl ether sulfone) materials. This provides for improved mechanical properties such as improved tensile strength, particularly for membranes and fibers. Preferably, the poly (biphenyl ether sulfones) of this invention have an Mn which meets the following equation:

$Mn>0.25\ Mw+8,400$ more preferably where $Mn>0.25\ Mw+9,000$ most preferably when $Mn>0.25+10,000$ More preferably, the poly (biphenyl ether sulfones) of this invention have an Mn and Mw which meet the following equations:

$Mn>0.287\ Mw+6,425$ more preferably $Mn>0.287\ Mw+6,800$ most preferably $Mn>0.287\ Mw+7,200$.

The poly (biphenyl ether sulfones) of this invention have a relatively low polydispersity (i.e., Mw/Mn) compared to prior poly (biphenyl ether sulfone) materials. This provides for improved mechanical properties such as improved tensile strength, particularly for membranes and fibers. Higher amounts of low molecular weight oligomers, including cyclic oligomers, lowers the number average molecular weight whereas the weight average molecular weight is less affected. Thus where the level of low molecular weight oligomers is increased, the polydispersity is increased. Preferably, the poly (biphenyl ether sulfones) of this invention have a polydispersity which meets the following equation:

$Polydispersity<14.1\times10^{-6}\ Mw+1.70$ more preferably where $Polydispersity<14.1\times10^{-6}\ Mw+1.68$ most preferably where $Polydispersity<14.1\times10^{-6}\ Mw+1.66$ Preferably, the Mw of the poly (biphenyl ether sulfone) of this invention is in the range of about 40,000 to about 60,000, more preferably about 44,000 to about 60,000, most preferably about 44,000 to about 58,000. The Mn of the poly (biphenyl ether sulfone) of this invention is preferably in the range of about 16,000 to about 25,000, more preferably about 18,000 to about 22,500.

The Mn and Mw of the poly (biphenyl ether sulfone) are conveniently measured by size exclusion chromatography using the same column and conditions described hereinabove for the analysis of the oligomer content and using polystyrene as a calibration standard.

The poly (biphenyl ether sulfone) can be prepared, for example, by the carbonate method or by the alkali metal hydroxide method.

In the carbonate method, the polysulfones are prepared by contacting substantially equimolar amounts of 4,4'-biphenol, optionally with one or more other bishydroxy aromatic compounds such as 4,4'-dihydroxydiphenyl sulfone, hydroquinone, bisphenol A, and the like, and dihalodiarylsulfones, e.g., 4,4'-dichlorodiphenyl sulfone or 4,4'-difluorodiphenyl sulfone, with from about 0.5 to about 1.0 mole of an alkali metal carbonate per mole of hydroxyl group in a solvent mixture comprising a solvent which forms an azeotrope with water in order to maintain the reaction medium at substantially anhydrous conditions during the polymerization. The temperature of the reaction mixture is kept at about 170° C. to about 350° C., preferably from about 210° C. to about 300° C. for about one to 15 hours. Typically, if the reaction is conducted at atmospheric pressure, the temperature of the reaction is typically limited by the boiling temperature of the solvent selected.

In a modification which is particularly suitable for making copolymers from 4,4'-biphenol and one or more additional dihydroxy compounds, the reactants other than the additional dihydroxy compounds are charged and heated at from about 120° C. to about 180° C. for about one to about 5 hours, the additional dihydroxy compounds are added, the temperature is raised and the mixture is heated at from about 200° C. to about 250° C., preferably from about 210° C. to about 240° C., for about one to 10 hours. The reaction is carried out in an inert atmosphere, e.g., nitrogen, at atmospheric pressure, although higher or lower pressures may also be used.

The poly (biphenyl ether sulfone) is subsequently recovered by conventional techniques such as coagulation, solvent evaporation, and the like.

The solvent mixture preferably comprises a solvent which forms an azeotrope with water and a polar aprotic solvent. The solvent which forms an azeotrope with water includes aromatic hydrocarbons such as benzene, toluene, xylene, ethylbenzene, chlorobenzene and the like.

The polar aprotic solvents employed are those generally known in the art for the manufacture of poly (aryl ether sulfones) and include sulfur containing solvents such as those of the formula:

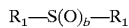

in which each $R_1$ represents a monovalent lower hydrocarbon group free of aliphatic unsaturation, which preferably contains less than about 8 carbon atoms or when connected together represents a divalent alkylene group with b being an integer from 1 to 2 inclusive. Thus, in all of these solvents, all oxygens and two carbon atoms are bonded to the sulfur atom. Contemplated for use in making poly(biphenyl ether sulfones) are such solvents as those having the formula:

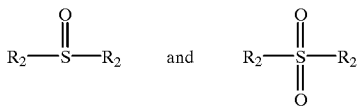

where the $R_2$ groups are independently lower alkyl, such as methyl, ethyl, propyl, butyl, and like groups, and aryl groups such as phenyl and alkylphenyl groups such as the tolyl group, as well as those where the $R_2$ groups are interconnected as in a divalent alkylene bridge such as

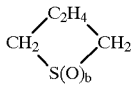

in tetrahydrothiophene oxides and dioxides. Specifically, these solvents include dimethylsulfoxide, dimethylsulfone, diphenylsulfone, diethylsulfoxide, diethylsulfone, diisopropylsulfone, tetrahydrothiophene-1,1-dioxide (commonly called tetramethylene sulfone or sulfolane) and tetrahydrothiophene-1-monoxide. Additionally, nitrogen containing solvents may be used. These include dimethylacetamide, dimethylformamide and N-methylpyrrolidone.

The azeotrope forming solvent and polar aprotic solvent are used typically in a weight ratio of from about 1:10 to about 1:1, preferably from about 1:5 to about 1:1.

In the reaction, the hydroxy containing compound, e.g., 4,4'-biphenol, is slowly converted, in situ, to the alkali salt thereof by reacting with the alkali metal carbonate. The alkali metal carbonate is preferably potassium carbonate. As indicated before, mixtures of carbonates such as potassium and sodium carbonate may also be used.

Water is continuously removed from the reaction mass as an azeotrope with the azeotrope forming solvent so that substantially anhydrous conditions are maintained during the polymerization.

In this method it is essential that the reaction medium be maintained substantially anhydrous during the polycondensation. While amounts of water up to about one percent can be tolerated, and are somewhat beneficial when employed with fluorinated dihalobenzenoid compounds, amounts of water substantially greater than this are desirably avoided as the reaction of water with the halo compound leads to formation of phenolic species and only low molecular weight products are obtained. Consequently, in order to secure the high polymers, the system should be substantially anhydrous, and preferably contain less than 0.5 percent by weight water during the reaction.

In the preferred procedure, the azeotrope-forming solvent, for example, chlorobenzene, is removed from the reaction mixture, typically by distillation, after the water formed in the reaction is removed leaving the poly(biphenyl ether sulfone) product dissolved in the polar aprotic solvent.

Preferably, after the desired molecular weight has been attained, the polymer is treated with an activated aromatic halide or an aliphatic halide such as methyl chloride or benzyl chloride, and the like. Such treatment of the polymer converts the terminal hydroxyl groups into ether groups which stabilize the polymer. The polymer so treated has good melt and oxidative stability.

While the carbonate method for preparing the polymers of this invention is simple and convenient, in some cases products of higher molecular weight can be made by the alkali metal hydroxide method. In the alkali metal hydroxide method a double alkali metal salt of a dihydric phenol is contacted with a dihalobenzenoid compound in the presence of a sulfur containing solvent herein above defined under substantially anhydrous conditions. Johnson et al., U.S. Pat. Nos. 4,108,837 and 4,175,175 describe processes for making poly (biphenyl ether sulfones) in a sulfur containing solvent by the alkali metal hydroxide method. Additionally, poly (biphenyl ether sulfones) can be prepared by a method in which the dihydric phenol comprising 4,4'-biphenol and at least one dihalobenzenoid compound are heated, for example, with a mixture of sodium carbonate or bicarbonate and a second alkali metal carbonate or bicarbonate. The carbonates, bicarbonates and alkali metal hydroxides are examples of basic compounds.

The poly (biphenyl ether sulfones) of this invention have improved polydispersity and a low level of undesirable low molecular weight oligomeric components. The improved poly (biphenyl ether sulfones) of this invention can be prepared by controlling the concentration of monomer reactants in the solution used to conduct the polymerization reaction. As described above, poly (biphenyl ether sulfones) can be prepared by reacting a dihalodiarysulfone, e.g., 4,4'-dichlorodiphenyl sulfone, with dihydroxy aromatic compounds comprising 4,4'-biphenol in the presence of a base under substantially anhydrous conditions and in a solvent comprising a mixture of a polar aprotic solvent and a solvent which form an azeotrope with water (e.g. chlorobenzene). By appropriately adjusting the concentration of 4,4'-biphenol (and other bisphenols, if used) and the 4,4'-halodiphenyl sulfone in the reaction solvent mixture, the poly (biphenyl ether sulfones) having reduced amounts of low molecular weight oligomeric materials and improved polydispersity can be prepared. As used herein with respect to the polymerization reaction mixture, "percent solids" means the percent by weight of polymer at the end of the polymerization reaction in the polymerization reaction mixture, preferably after the azeotrope-forming solvent has been removed, to the total weight of the polymer plus polar aprotic solvent, e.g., sulfolane. Insoluble salts, if present, are not counted in this calculation of "percent solids." Thus, when the percent solids in the polymerization reaction solution is greater than about 30 weight percent, more preferably at least about 45 weight percent, and most preferably at least about 55 weight percent, a poly (biphenyl ether sulfone) of this invention having improved polydispersity, improved flow properties, and low levels of undesirable low molecular weight oligomer can be prepared.

Thus, this invention is a method for preparing a poly (biphenyl ether sulfone) comprising reacting in a polymerization reaction mixture at least one bishydroxy aromatic compound comprising at least 4,4'-biphenol with at least one dihalodiaryl sulfone, preferably 4,4'-dichlorodiphenyl sulfone, in the presence of a solvent comprising a polar aprotic solvent, preferably sulfolane, and at least one basic compound, such as those described hereinabove, to form a poly (biphenyl ether sulfone) wherein the amount of bishydroxy aromatic compound comprising 4,4'-biphenol and the amount of dihalodiaryl sulfone is selected so that the amount of poly (biphenyl ether sulfone) present at the end of the polymerization reaction is greater than about 30 weight percent based on the combined weight of poly (biphenyl ether sulfone) and the polar aprotic solvent, preferably at least about 40 weight percent and most preferably at least about 50 weight percent.

The poly (biphenyl ether sulfones) of this invention can be used to manufacture a variety of articles such as films, sheets and fibers. Due in particular to improved flow properties, they are highly suitable for manufacturing molded articles such as cookware, (e.g., cooking trays or pans), medical trays, aircraft parts and plumbing parts.

In addition to preparing the poly (biphenyl ether sulfones) of this invention having low levels of desirable low molecular weight oligomers and improved polydispersity, the method described above for preparing such poly (biphenyl ether sulfones) can also be used to prepare improved polyethersulfones having low levels of low molecular weight oligomer, improved polydispersity and improved melt flow by reacting a dihalodiphenyl sulfone with a biphenol comprising bisphenol S (also named 4,4'-sulfonyldiphenol) using the same solvents, basic compounds such as carbonates or hydroxides, activated aromatic or aliphatic halides, as described above except that a dihydric phenol comprising bisphenol S instead of 4,4'-biphenol is used.

In order to prepare such polyethersulfones having low levels of oligomeric materials, improved polydispersity and improved melt flow characteristics, the concentration of bisphenol S (and other bisphenols, if used) and the 4,4'-dihalodiphenyl sulfone is adjusted such that the percent solids (as defined above) in the polymerization reaction solution used to prepare the polysulfone is greater than about 35 weight percent, more preferably at least about 40 weight percent and most preferably at least about 50 weight percent. The preferred polar aprotic solvent used to prepare polyethersulfones made with a bisphenol comprising bisphenol S is sulfolane. Various amounts of at least one other bisphenol can be included with the bisphenol S, such as bisphenol A (4,4'-isopropylidenediphenol) or hydroquinone. If used, the amount of such other bisphenol is suitably about 1 to about 50 mole percent, preferably about 20 to about 30 mole percent of the total number of moles of bisphenol present. Preferably the other bisphenol if used is hydroquinone.

Thus, this invention is a method for preparing a polyethersulfone having low levels of low molecular weight oligomeric components, for example, less than about 1 weight percent, improved polydispersity and superior melt flow properties comprising reacting in a polymerization reaction mixture at least one bishydroxyl aromatic compound comprising at least bisphenol S with at least one dihalodiaryl sulfone, preferably 4,4'-dichlorodiphenylsulfone, in the presence of a polar aprotic solvent, preferably sulfolane, and at least one basic compound as described above to form a polyethersulfone comprising residues from bisphenol S and the dihalodiarylsulfone wherein the amount of polyethersulfone present at the end of the polymerization reaction is greater than about 35 weight percent, preferably at least about 45 weight percent, and most preferably at least about 50 weight percent based on the combined weight of polyethersulfone and the polar aprotic solvent.

The polyethersulfones of this invention comprising residues from bisphenol S and hydroquinone have low levels of low molecular weight oligomers, preferably less than about 1 weight percent, more preferably less than about 0.9 weight percent based on the weight of the plyethersulfone. The low molecular weight oligomer in the polyethersulfone is typically about 4000 and lower, more preferably 2000 and lower.

The improved polyethersulfones of this invention and useful for making a variety of articles such as films, sheets and fibers. They are particularly suitable for manufacturing molded articles such as electrical "chip" trays and other parts for electronic or electrical components as well as, for example, automotive fuses and membranes.

The improved poly (biphenyl ether sulfones) and improved polyethersulfones of this invention can be blended with other polymeric materials such as, for example, polyetherketones, other poly (aryl ether sulfones), poly ether imides, polyesters, polyamides and polycarbonates. The improved poly (biphenyl ether sulfones) and improved polyethersulfones as well as blends as described above can include fillers such as carbonates including chalk, calcite and dolomite; silicates such as mica, talc, wollastonite; silicon dioxide; glass spheres; glass powder; clay; quartz and the like. They can also include reinforcing fibers such as glass fiber, carbon fibers and the like. They can also include additives used in polymers of this kind such as titanium dioxide, zinc compounds such as zinc borate, thermal stabilizers, ultraviolet light stabilizer, and the like.

The following examples provide specific illustrations of the present invention but are not to be construed in any way as a limitation on its scope or generality.

U.S. Provisional Application No. 60/101,878 filed Sep. 25, 1998, is hereby incorporated by reference in its entirety.

EXAMPLES

The oligomer content of the poly (biphenyl ether sulfones) was determined by Size Exclusion Chromatography using methylene chloride as the mobile phase and an ultraviolet (UV) detector at 254 nanometers. The column used was a PL gel 5 $\mu$m mixed-D, 300×7.5 mm, available from Polymer Laboratories. A flow rate of the methylene chloride mobile phase of 1.5 mL/minute was used. The sample size (typically 10 microliters of a 0.5 wt. % solution in methylene chloride) was selected so that the dynamic range of the UV detector was not exceeded by the large elution peak due to the poly (biphenyl ether sulfone) polymer. The oligomeric materials reported here are the two major, substantially resolved peaks that elute after the poly (biphenyl ether sulfone) and prior to the elution of the solvents. In calculating the weight percent oligomers, it was assumed that the UV detector response factor based on weight of the material eluted was the same for the oligomers and the poly (biphenyl ether sulfone) polymer. When calculating the areas of the peaks of the oligomer, the computer software program was used to calculate the areas was set to force a line from the valleys between the peaks and perpendicular to the base line. FIG. 1 shows a typical chromatogram showing how the areas were calculated and the location of the two oligomer peaks and the forced vertical lines between peaks used in the determination of percent oligomer in the samples and reported in Table 1 as Olig 1 and Olig 2 as weight percent of polymer sample.

The Mn and Mw measurements were measured by Size Exclusion Chromatography using the same analytical procedure as used for the determination of the oligomer content as described above. Waters Millennium 2010 Gel Permeation Chromatograph software was used to calculate the Mw and Mn values. Polystyrene molecular weight standards were used for calibration.

Procedures for Melt Flow Determinations

Melt flows as reported herein were measured using a Tinius Olsen plastometer operating at 400° C. The procedure is as follows: A sample of polymer was dried overnight in a vacuum oven at 120° C. A 5 gram sample of the dried polymer was added to the barrel of the plastometer with the die and die plug already in place. The piston was placed in the barrel, a 2060 g (1 lb.) weight placed on the piston, and a 10 minute heating period was started. About 5–10 seconds prior to the expiration of the 10 minute heating period the die plug was removed. At the expiration of the 10 minute heating period, extruded polymer "cuts" were taken every 5, 10 or 20 (or more) seconds. The time for the cuts was selected to produce a cut 1 to 1.5 inches long. After cooling, each cut was weighted to the nearest 0.0001 grams. The melt flow (MF) was calculated as follows:

$$MF\,(g/10\text{ minutes}) = \left(\frac{600}{\text{no. seconds per cut}}\right)(\text{avg. wt. of cuts})$$

Examples 1–6

The following is the procedure for preparing the polymers of Example 1–6. The analytical and physical property data for those examples is provided in Table 1.

Synthesis of Poly (biphenyl ether sulfones) at 45% Reaction Solids

A 500 mL, 4-neck round bottom flask was equipped through its center neck with an overhead stirrer attached to a stainless steel paddle. Through one of its side necks, a Claisen adapter was attached. A thermocouple thermometer was inserted through the Claisen adapter which was in-turn attached to a temperature controller. The other neck of the Claisen was attached to a Dean-Stark trap and a water cooled condenser. A gas inlet tube and a stopper were placed in the other necks of the round bottom flask. The reactor was placed in an oil bath which was connected to the temperature controller.

Biphenol (26.068 g), 4,4'-dichlorodiphenyl sulfone (40.205 g), anhydrous potassium carbonate (20.509 g, 6% excess), sulfolane (68.4 g) and chlorobenzene (43.6 g) were charged to the reactor. The agitator was started to 300 rpm. The whole reactor was evacuated with pump vacuum and filled with nitrogen. The degassing operation was accomplished two more times. A steady stream of nitrogen through the reactor solution was started. The reactor temperature was set to 220° C. and the stirring speed was increased to 400 rpm. Care was taken not to splash the reaction solution too high on the reaction flask walls. The chlorobenzene which distilled, along with the water of the reaction that was formed, was collected in the Dean-Stark trap and not returned to the reaction flask. Thus, the chlorobenzene initially added and the water formed was removed from the reaction mixture as the temperature of the reaction mixture increased. The desired temperature was reached in 30 to 40 minutes. The reactor temperature was maintained at 220° C. When the viscosity started to increase the agitator speed was increased to 500 rpm. At the time selected to end the polymerization reaction, generally, after 70 to 80 minutes of reaction time after reaction reached 220° C. (at this stage substantially all of the chlorobenzene was distilled out of the reaction mixture), a mixture of sulfolane (90 g) and chlorbenzene (50 g) was slowly added from an addition funnel to cool the reaction. The temperature controller was reset to 160° C. The distilled chlorobenzene was either removed from the reaction mixture or returned to maintain the temperature of 160° C. Methyl chloride gas was added for 30 minutes (18 to 22 g). Shortly after the addition of methyl chloride was started, an aqueous solution of potassium carbonate (0.4 g in 3 ml water) was added via syringe. After 30 minutes of methyl chloride addition, the oil bath was removed. The reactor solution was diluted with 200 ml chlorobenzene to allow filtration. To remove salts, the polymer solution was filtered through a 2 micron filter in a pressure filter funnel using 10–20 psig nitrogen. The polymer was recovered by slowly adding the salt-free solution (up to 100 mL) into a mixture of 500 g of methanol and water in a ratio of 70:30 under high speed agitation in a blender with a cover containing a small opening through which the polymer solution was added. The precipitate was recovered by filtration and returned to the blender. Successive washings of the precipitate in the blender were completed using 400 g methanol, 400 g deionized water and finally with 400 g methanol. The washed precipitate was filtered one more time and dried in a vacuum oven (60 mm) at 120° C. with an air-bleed.

The dried polymer was analyzed by measuring reduced viscosity as 0.2 g polymer in 100 ml. of N-methyl pyrrolidone solvent at 25° C. and by chromatography for molecular weights and oligomer content by the method described above.

Table 1 also indicates the same analysis for commercial comparative samples of poly (biphenyl ether sulfone).

The data in Table 1 demonstrates the improved properties of the new (biphenyl ether sulfone) of this invention. The new (biphenyl ether sulfones) have improved polydispersity, improved Mn and a lower amount of undesirable oligomeric materials for a given Mw, and a superior melt flow for a given Mn.

For example, a comparison of Example 3 in the Table with commercial comparative sample 3 shows that, for materials of similar Mw, the new (biphenyl ether sulfone) of this invention has an Mn of 23,014 compared to 21,195, an improved polydispersity of 2.29 compared to 2.43 and a lower oligomer content of 0.74% compared to 1.05%.

Example 7
Synthesis of Polyethersulfone at 50% Reaction Solids

A one-liter 4-neck round bottom flask was equipped with an overhead stirrer attached to a stainless steel paddle through its center neck. Through one of its side necks, a Claisen adapter was attached. A thermocouple thermometer was inserted through the Claisen adapter which was in-turn attached to a temperature controller. The other neck of the Claisen was attached to a heavier-than-water Barrett trap and a water cooled condenser. A nitrogen inlet tube and a stopper were placed in the other necks of the round bottom flask.

The reactor was charged with dichlorodiphenyl sulfone (172.31 g), bisphenol S (112.62 g), hydroquinone (16.58 g), potassium carbonate (87.89 g), sulfolane (258 g) and chlorobenzene (162 g). The reactor was carefully degassed by vacuum and filled with nitrogen. Care was exercised not to allow splashing of the reactants outside of the reaction zone.

A slow and steady stream of nitrogen was allowed to enter into the reactor solution throughout the operation. The reactor was immersed in an oil-bath and the internal reactor temperature was set to 235° C. Chlorobenzene started to boil and collect at the trap around 145° C. As the temperature continued to climb, more chlorobenzene distilled over and finally the distillation stopped. Around 190° C., fresh chlorobenzene from an addition funnel at a rate of 1 ml per minute was added and the addition was continued throughout the polymerization. This slow addition of chlorobenzene was employed to continue to remove water from the reaction mixture. Thus, the distilled chlorobenzene was collected at the trap and was not returned to the reactor. At about 230° C., slightly yellow colored salts started to dissolve. The polymerization was continued at the reaction temperature of 230° to 235° C. for 45 minutes. Once the desired viscosity was reached, addition of chlorobenzene was stopped. At this point the concentration of chlorobenzene in the reaction mixture was minimal. A mixture of chlorobenzene/sulfolane (1000 g, 80/20 weight ratio) was added to arrest the polymerization by reducing the temperature. The distilled chlorobenzene was continuously returned to reactor during cooling. The temperature of the mixture was set at 145° C. While maintaining the temperature between 140° to 150° C. by addition or removal of distilled chlorobenzene, a slow stream of methyl chloride (5 g) was added over 30 minutes to effect termination after which the oil-bath was removed.

The cooled reactor solution was pressure filtered through a Teflon filter. The clear filtrate was added slowly into 5 to 10 volumes of methanol taken and agitated in a blender. The precipitated white polymer fluff was recovered by filtration and washed successively with additional methanol and hot water. The wet polymer fluff was dried at 110° C. The reduced viscosity of the polymer was 0.51 (0.2 g in 100 ml NMP). The molecular weights were measured by gel permeation chromatography.

TABLE 1

Table 1. Poly (Biphenyl Ether Sulfone) Made at 45 Percent Solids

| Reaction[g] | % Solids[a] | Mw[b] | RV[c] | MF @ 400 C.[d] | Mn[e] | Mw/Mn[f] | Olig 1 | Olig 2 | Olig 1 + 2 |
|---|---|---|---|---|---|---|---|---|---|
| Example 1 | 45 | 60634 | 0.63 | 5.1 | 25751 | 2.35 | 0.22 | 0.5 | 0.72 |
| Example 2 | 45 | 56865 | 0.61 | 7.8 | 24993 | 2.28 | 0.22 | 0.48 | 0.70 |
| Example 3 | 45 | 52682 | 0.59 | | 23014 | 2.29 | 0.24 | 0.5 | 0.74 |
| Example 4 | 45 | 45750 | 0.51 | | 19908 | 2.30 | 0.31 | 0.61 | 0.92 |
| Example 5 | 45 | 44884 | 0.5 | | 19744 | 2.27 | 0.34 | 0.62 | 0.96 |
| Example 6 | 45 | 41243 | 0.45 | 40.4 | 18889 | 2.18 | 0.28 | 0.63 | 0.91 |
| Comparative Sample 1 | | 55387 | | 9.8 | 22092 | 2.51 | 0.33 | 0.69 | 1.02 |
| Comparative Sample 2 | | 55327 | | 12.4 | 22227 | 2.49 | 0.33 | 0.7 | 1.03 |
| Comparative Sample 3 | | 51473 | | 14 | 21195 | 2.43 | 0.34 | 0.71 | 1.05 |
| Comparative Sample 4 | | 49805 | | 20 | 20479 | 2.43 | 0.36 | 0.74 | 1.10 |
| Comparative Sample 5 | | 47325 | | 24.2 | 19881 | 2.38 | 0.34 | 0.73 | 1.07 |
| Comparative Sample 6 | | 47437 | | 27.7 | 19897 | 2.38 | 0.35 | 0.73 | 1.08 |

[a]Percent polymer in final polymerization mixture.
[b]Weight average molecular weight.
[c]Reduced viscosity measured in N-methyl pyrrolidone at 25° C. and 0.2 g of polymer in 100 ml. of solvent.
[d]Melt Flow.
[e]Number average molecular weight.
[f]Polydispersity, i.e. Mw/Mn.
[g]Comparative examples are commercial materials.

Having described the invention, that which is claimed is:

1. A poly(biphenyl ether sulfone) comprising the following repeating units

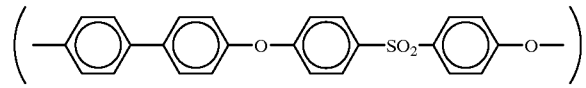

said polymer having a Mw of from about 40,000 to about 60,000, and containing less than about 1 wt % oligomers having a molecular weight of from about 400 to about 4000.

2. The (biphenyl ether sulfone) of claim 1 having a Mn greater than 0.25 Mw+8,400.

3. The (biphenyl ether sulfone) of claim 1 further comprising repeating units selected from units of the formula

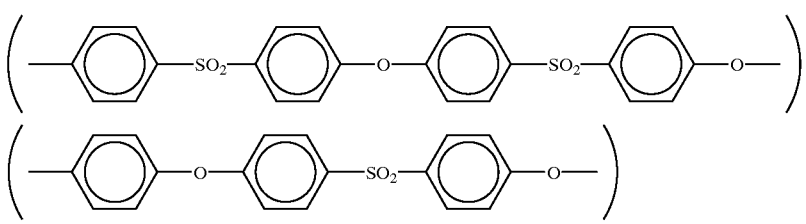

4. The (biphenyl ether sulfone) of claim 1 comprising from about 75 to 100 mole percent of said repeating units.

5. The (biphenyl ether sulfone) of claim 1 consisting of said repeating units.

6. The poly(biphenyl ether sulfone) of claim 1 having a polydispersity (Mw/Mn) of about 2.35 and lower.

7. The poly(biphenyl ether sulfone) of claim 1 wherein the polydispersity Mw/Mn<14.1×10$^{-6}$+1.70.

8. Molded articles made from the poly (biphenyl ether sulfone) of claim 1.

9. A method for preparing a poly(aryl ether sulfone) selected from the group consisting of poly(biphenyl ether sulfones) and polyethersulfones comprising reacting in a polymerization reaction mixture at least one bishydroxy aromatic compound comprising at least 4,4'-biphenol or at least bisphenol S, with at least one dihalodiaryl sulfone in the presence of a solvent comprising a polar aprotic solvent and at least one basic compound to form a poly(aryl ether sulfone) wherein the amount of bishydroxy aromatic compound comprising 4,4'-biphenol or comprising bisphenol S and the amount of dihalodiaryl sulfone is selected so that the amount of the poly(aryl ether sulfone) present at the end of the polymerization reaction is at least about 35 weight percent based on the combined weight of the poly(aryl ether sulfone) and the polar aprotic solvent.

10. The method of claim 9 wherein the solvent comprisies a mixture of a polar aprotic solvent and a solvent which forms an azeotrope with water.

11. The method of claim 10 wherein the solvent which forms an azeotrope with water is removed from the polymerization reaction by distillation prior to recovery of the poly(aryl ether sulfone).

12. The method of claim 9 wherein the poly(aryl ether sulfone) is polyethersulfone and the bishydroxy aromatic compound comprises bisphenol S.

13. A method for preparing a poly (biphenyl ether sulfone) comprising reacting in a polymerization reaction mixture at least one bishydroxy aromatic compound comprising at least 4,4'-biphenol with at least one dihalodiaryl sulfone in the presence of a solvent comprising a polar aprotic solvent and at least one basic compound to form a poly (biphenyl ether sulfone) wherein the amount of bishydroxy aromatic compound comprising 4,4'-biphenol and the amount of dihalodiaryl sulfone is selected so that the amount of the poly (biphenyl ether sulfone) present at the end of the polymerization reaction is greater than about 30 weight percent based on the combined weight of the poly (biphenyl ether sulfone) and the polar aprotic solvent.

* * * * *